United States Patent

[11] 3,605,029

| [72] | Inventor | Nathan Freedman<br>West Newton, Mass. |
|---|---|---|
| [21] | Appl. No. | 837,627 |
| [22] | Filed | June 30, 1969 |
| [45] | Patented | Sept. 14, 1971 |
| [73] | Assignee | Raytheon Company<br>Lexington, Mass. |

[54] SIGNAL DETECTION APPARATUS
2 Claims, 3 Drawing Figs.

[52] U.S. Cl............................................... 328/167,
307/233, 325/474, 328/139, 328/140, 340/2,
343/6.5
[51] Int. Cl................................................ H04b 15/00
[50] Field of Search.......................................... 343/6.5;
340/2; 325/473, 474; 328/165, 167

[56] References Cited
UNITED STATES PATENTS
2,910,665  10/1959  Hawkins.....................  340/2

3,076,939  2/1963  Wycoff ........................  325/474 X
3,103,009  9/1963  Baker..  ........................  325/474 X

*Primary Examiner*—T. H. Tubbesing
*Attorneys*—Philip J. McFarland and Joseph D. Pannone ABSTRACT: A receiver for use in a system in which randomly varying target-indicating signals from a transducer are detected in the presence of noise signals which may vary in amplitude between wide limits. Advantage is taken of the fact that the spectrum of frequencies of randomly varying target-indicating signals differs from the spectrum of frequencies of noise signals. Therefore, by appropriately multiplexing and filtering the signals from a transducer, separate signals proportional, respectively, to the root mean square value of noise signals and target-indicating signals may be derived and compared to produce an output signal which changes from one level to another when target-indicating signals are present.

INVENTOR
NATHAN FREEDMAN

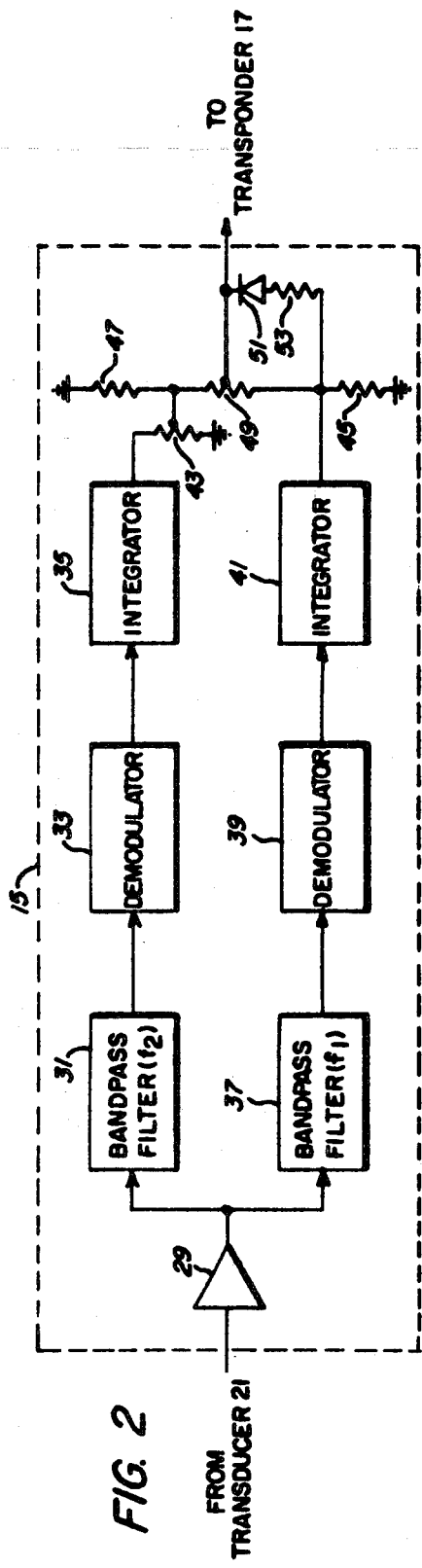

SIGNAL DETECTION APPARATUS

BACKGROUND OF THE INVENTION

This invention pertains generally to signal detection apparatus and particularly to apparatus of such nature which is adapted to detecting noiselike signals in the presence of noise signals.

It is to be understood that the term "noise signal," or "noise signals," when used hereinafter should be taken to mean any unwanted energy which interferes with the ability of a receiver to detect a wanted signal. Such energy may arise from a source, or sources, inside or outside the receiver and may have any spectral width within the bandwidth of the receiver. Unless specifically noted, however, cyclical or repetitive signals which interfere with the detection process will not be considered to be noise signals. It is also to be understood that the term "noiselike signal," or "noiselike signals," should be taken to mean a signal, or signals, desired to be detected which vary randomly in frequency and/or amplitude within a spectral width which may, or may not, be coextensive with the bandwidth of the receiver. In other words, a noiselike signal is a signal which may not be detected in the presence of a noise signal using known signal enhancement or correlation techniques. It should also be understood that "detection" is used herein in the sense of recognizing the presence of a signal and not in the sense of demodulating a modulated carrier signal.

It is known in the art that noiselike signals may, under controlled conditions, be detected in the presence of noise signals. That is, a receiver may be adjusted so that its threshold level differs from the root mean square level of competing noise signals to such a degree that any signal which is greater than the minimum detectable signal of the receiver may be taken to be a desired signal. There are, however, in practical receivers of this type, two independent parameters (the root mean square level of the noise signals and the threshold level) which must be considered. If the two are fixed initially, then a satisfactory compromise between the number of missed signals and false signals may be reached. If, however, the level of either changes relative to the other, then the original compromise loses its validity. As a result, the receiver either fails to detect signals it should detect or its false alarm rate becomes excessively great.

It has been common practice in the art to minimize the effect of changes in the level of noise signals by providing automatic gain control circuits in the receiver. Such a receiver is sometimes referred to as a "constant false alarm receiver" (CFAR). One form of CFAR uses the average noise level to provide an automatic gain control signal to render the receiver less sensitive when the noise level increases. Another known form of CFAR used the average noise signal level to adjust the threshold level as the noise signal changes. Known CFAR, however, all reduce the probability of detection. That is, signals which would be detected in a conventional receiver may not be detected in a CFAR because such signals do not cross the threshold level in a CFAR.

While techniques of the kind just mentioned have been useful in situations in which operators are present to adjust the equipment according to conditions, such techniques are not too effective when unattended equipment is involved. For example, in a system such as is shown in Arsove, U.S. Pat. No. 3,344,420, issued Sept. 26, 1967, assigned to the same assignee as this application, sensing and transponding devices are scattered throughout a portion of the ocean to detect the passage of particular types of acoustic "noise generators." Each such device includes an acoustic transducer which is responsive to background sea noise as well as to desired noiselike signals from a selected type of target. When interrogated, each device transmits a signal indicative of the presence or absence of a target. It is obvious that, in such an application, means must be provided to permit operation whatever the sea state may be. In the past it has been the practice to make any required adjustments at the interrogating station. While such an approach permits operation under almost all conditions, it is not the best approach. There are two major reasons why adjustment at the interrogating station is not ideal: (1) several of the sensing and transponding devices must be interrogated simultaneously, which means that the number of such devices per unit area must be relatively high; and (2) the response of each individual one of the sensing and transducing devices to any input signal must be maintained within close limits, which means that each one must maintain its stability over long periods of time even through environmental conditions may change radically.

Therefore, it is a primary object of this invention to provide, for use particularly in unmanned sensing and transponding systems, an improved receiver which is adapted to distinguishing between background noise signals and noiselike signals desired to be detected even though the background noise signals vary greatly in magnitude.

Another object of this invention is to provide an improved receiver in which the threshold level for detection of signals remains substantially independent of the level of background noise signals.

Still another object of this invention is to provide an improved receiver which is adapted to detecting noiselike signals in the presence of background noise with a high degree of confidence over extended periods of time.

SUMMARY OF THE INVENTION

These and other objects of this invention are attained generally by providing, in a system for monitoring an area to determine the presence or absence of a target, a receiver in which noise signals and target-indicating signals are multiplexed, in one branch circuit passing through a band-pass filter having a center frequency corresponding to the center frequency of noiselike target-indicating signals and in another branch circuit passing through a band-pass filter having a center frequency removed from any frequency of such target-indicating signals. After passing through the band-pass filters the signals are demodulated and then integrated so as to provide two signals, each of which represents the root mean square value of the signals passed by its corresponding bandpass filter. The two root mean square signals out of integrators are then applied to a threshold circuit, the state of which is indicative of the presence or absence of a target-indicating signal.

BRIEF DESCRIPTION OF THE DRAWINGS

For a more complete understanding of the invention reference is now made to the following description of the drawings in which

FIG. 2 is a combined block and schematic diagram of a first embodiment of the receiver shown in FIG. 1; and FIG. 3 is a combined block and schematic diagram illustrating an alternative preferred embodiment of the receiver shown in FIG. 1.

DESCRIPTION OF THE PREFERRED EMBODIMENTS

Figure 1:
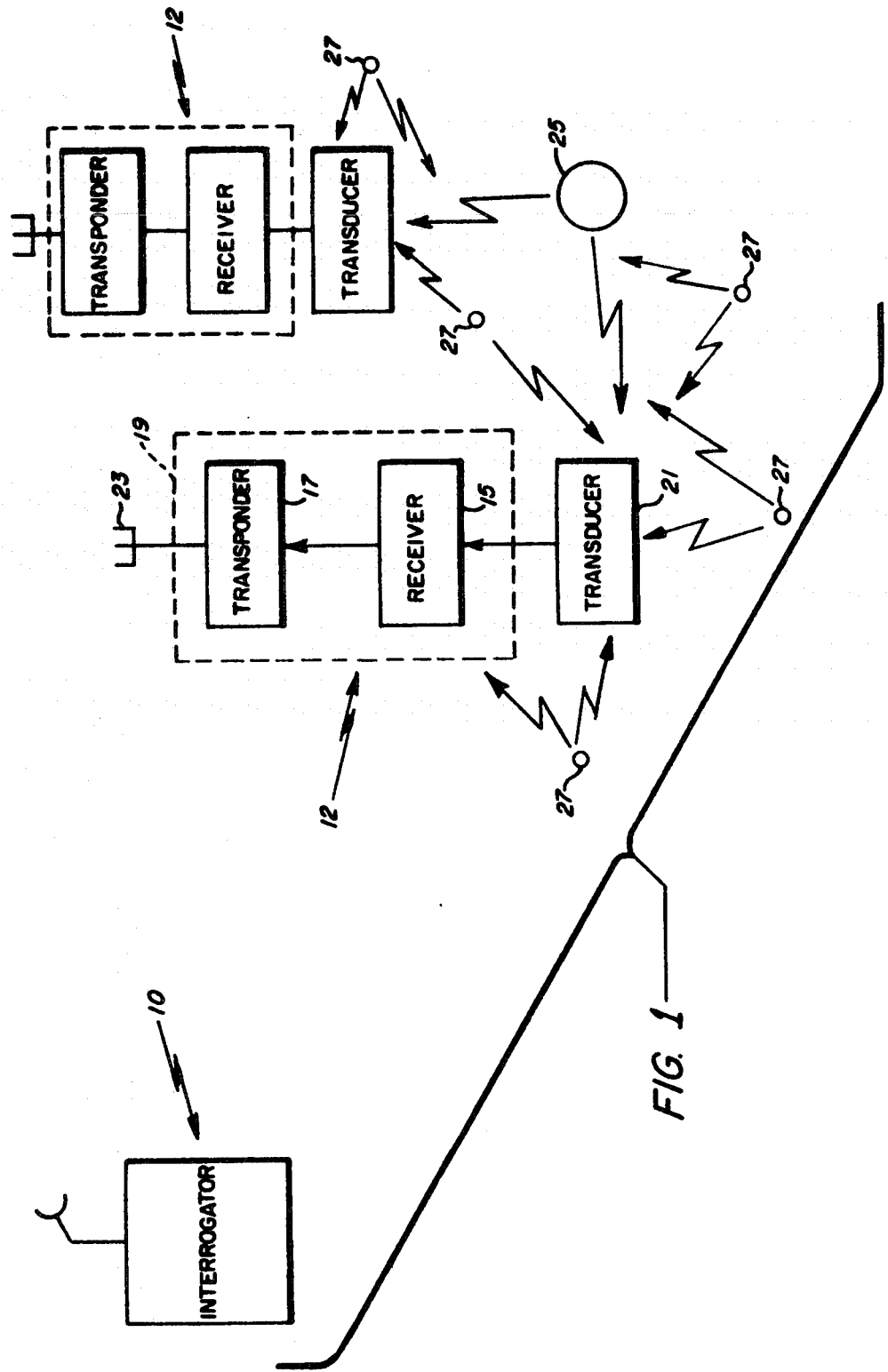
FIG. 1 is a block diagram, simplified to illustrate the principles of this invention, showing two sensing and transponding stations in combination with an interrogating station.

Referring now to FIG. 1, it may be seem that the system includes an interrogator 10 which is here simply shown in block form. It should be understood, however, that the interrogator 10 may conveniently be as shown in Arsove, U.S. Pat. No. 3,344,420. As noted previously, two sending and transponding stations 12 are illustrated, it being understood, however, that in an operating system the number of such stations would probably be far greater. Each one of the sensing and transponding stations 12 is constructed in the same way, so only one will be described. Each such station includes a receiver 15 and a transponder 17 supported within a container 19. A transducer 21 and an antenna 23 are supported on either end of the container 19 and are electrically connected, respectively, to the receiver 15 and the transponder 17. The transducer 21 (which is here taken to be an acoustic transducer) is immersed in the ocean so as to respond to signals from a target 25 and noise sources 27. It will be recognized that, at any instant in time, there may or may not be a target within the field of the transducer 21 and that the number and distribution of noise sources 27 will be dependent primarily on the then existing sea state.

Assuming the situation in which a target 25 is within the field of the transducer 21 and that such target emits noiselike signals, the transducer 21 will convert such noiselike signals to corresponding electrical signals which are fed into the receiver 15. At the same time, noise signals from the noise sources 27 will also energize the transducer 21 and be fed into the receiver 15. The relative phase and amplitude of the noiselike signals from the target 25 and the noise sources 27 are, be definition, unpredictable. The receiver 15, for reasons to be explained in detail hereinafter in connection with the description of FIGS. 2 and 3, will produce a first control signal for the transponder 17 when the root mean square value of the noise signals and the target signals exceeds the root means square value of the noise signal alone. The receiver 15 will produce a second control signal for the transponder 17 when the root mean square value of the former does not exceed the root mean square value of the latter. It follows, therefore, that upon transmission of an interrogating signals from the interrogator 10, the transponder 17 produces a reply signal indicative of presence or absence of a target.

Referring now to FIG. 2, it may be seen that a first embodiment of the receiver 15 includes an amplifier 29 having an output signal corresponding to the total signal from the transducer 21 of FIG. 1. Such an output signal is divided into two paths, the first including a band-pass filter 31 having a center frequency of, say, $F_2$, the output of such filter 31 being passed through a demodulator 33 to an integrator 35. The second path for signals out of the amplifier 29 includes a band-pass filter 37 having a center frequency of, say, $F_1$, a demodulator 39 and an integrator 41. The demodulators 33, 39 may take the form of a conventional linear detector although it is also within the concept of this invention to use square law detectors. The integrators 35, 41 preferably are identical in construction and may consist of conventional resistance capacitance circuits. The only limitation on the integrators 35, 41 is that each have a time constant which is relatively long as compared to the short term variations in the noise signal component of the signal from the transducer 21. The output of the integrator 35 is fed through a resistor 43 to ground while the output of the integrator 41 is fed through a resistor 45 to ground. A point on the resistor 43 is connected through resistor 47 to ground and through a resistor 49 to the output of the integrator 41. A point on the resistor 49 is connected to the cathode of a diode 51 (from which point an output is taken to the transponder 17). The output of the integrator 41 is connected through a resistor 53 to the anode of the diode 51.

It will be observed that the difference in potential across the resistor 49 is determined by the level of the output signal from the integrator 41 and the level of the signal out of the integrator 35. It will be observed that the difference in potential across the resistor 49 may be changed by changing the point on the resistor 43 to which resistor 49 is connected. A moment's thought will make it clear that the difference in potential across the resistor 49 controls the bias voltage on the diode 51. By selection of appropriate values of the various resistors the bias voltage of the diode 51 may be such as to forward bias that element when noise alone is present in the output signal from the transducer 21. In other words, when noise signals alone are present the diode 51 may be biased so as to be in its conductive state. When a noiselike signal is received by the transducer 21 from a target such a signal is passed through the band-pass filter 31 and is rejected by the band-pass filter 37. This means then that the output signal of the demodulator 33 and the integrator 35 increases while the output signal from the demodulator 39 and the integrator 41 remains constant. Such a differential effect by noiselike signals from a target ultimately raises the voltage in the upper end of the resistor 49 to such an extent that the diode 51 becomes back biased. The impedance of the receiver, as seen from the transponder 17, changes when the diode 51 becomes nonconductive. Such a change in impedance is effective to cause the transponder 17 to produce an output signal, when interrogated, indicative of the presence of a target within the field of the transducer 21. It will be noted that the connection of the various resistors 43, 45, 47, 49 to set up a threshold level for the diode 51 with any given level of noise signals from the transducer 21 may not be ideal for such level changes. It has been found, however, that the variation in the threshold level of the diode 51 is not too critical to proper operation of the circuit even though the level of the noise signals may vary substantially. It will also be noted that if the noise signals are not "white" that a change in the threshold level of the diode 51 may occur even without change in the noise signal level. The effect of such changes may be minimized, however, by providing as long a time constant as is convenient for the integrators 35, 41.

Referring now to FIG. 3, it may be seen that the alternative preferred embodiment of the receiver 15 includes many elements which are common to the receiver shown in FIG. 2. Such elements are numbered similarly. The construction and functions will therefore not be repeated in detail. The receiver shown in FIG. 3 differs from that of FIG. 2 in that a feedback loop is provided to compensate for variations in the noise signal component out of the transducer 21. Thus, integrator 41 is connected to a first input terminal of a differential amplifier 55, the second input terminal of which is connected to a biasing source 57. The positive output terminal of the differential amplifier 55 (meaning the output terminal having a signal in phase with the signal out of the integrator 41) is connected through a diode 56 to one side of resistor 53. Such diode is also connected through a variable resistor 58 to a biasing source 59 and to ground through a resistor 60. The negative output terminal of the differential amplifier 55 is connected through an attenuator 61 to the gain control terminal of an amplifier 63. This amplifier is inserted in the second signal path of the signal out of the amplifier 29 as shown. To complete the circuit the cathode of the diode 51 is connected to a point on the resistor 43 which also serves as an output terminal for the signal to the transponder 17.

Inspection of FIG. 3 will make it clear that the voltage on the cathode of the diode 51 changes in accordance with changes in the output level of the signal from the integrator 35. Changes in the latter in turn substantially depend on the presence or absence of a noiselike signal from the target. The voltage on the anode of the diode 51 is dependent first upon the voltage at the junction of the resistor 53 and the variable resistor 58 due to flow of current from the biasing source 59 through variable resistor 58 and resistor 60. The voltage on the anode of the diode 51 is also dependent upon the output at the positive terminal of differential amplifier 55 when diode 56 conducts. The level of the latter signal is in turn dependent upon the level of the signal out of the integrator 41. That is, whenever the level of the signal at the positive terminal of the differential amplifier 55 equals or exceeds the voltage due to the biasing source 59 the voltage on the anode of the diode 51 may be caused to track, in the absence of a target-indicating signal, with the output signal from the integrator 35. The connection of the negative output of the differential amplifier 55 through the attenuator 61 to the amplifier 63 causes the sensitivity of the latter to vary inversely with respect to the level of the signal out of the amplifier 29. Thus, in the absence of a target-indicating signal a change in the level of the noise signal out of the amplifier 29 will ultimately cause the level of the signal at the negative output terminal of the differential amplifier 55 to go more negative.

From the foregoing description of two preferred receivers embodying this invention, it may be seen that the concept of distinguishing between noise signals and noiselike signals desired to be detected may be implemented in various ways without departing from the concepts of this invention. That is, it will be recognized that the concept of separating noise signals and noiselike signals may be effected in any way which distinguishes between the frequency spectra of such signals. For example, it will be required that, under certain circumstances, it may be desired to limit the signals before multiplexing. Such processing of the signals will, as is well known, tend to reduce or eliminate the effect of variations in any noiselike signals which may pass through the band-pass filter. Further, it is not essential to this invention that the contemplated receiver be used in detecting acoustic signals. For example, this invention could be used in a system in which noiselike microwave signals are to be detected in the presence of noise signals, it being necessary only to provide appropriate circuitry to process signals of such character. It is felt, therefore, that this invention should not be restricted to its disclosed embodiments, but rather should be limited only by the spirit and scope of the appended claims.

What is claimed is:

1. In a system for detecting, in the presence of noise signals, noiselike signals from a transducer, a receiver comprising:
   a. first amplifying means, responsive to noise signals and to noiselike signals from the transducer, for producing signals varying in accordance with both such signals;
   b. multiplexing means for dividing the signals out of the first amplifying means into a first signal path and a second signal path, the first such path including filter means for passing the noiselike signals and the second such path including filter means for rejecting the noiselike signals and passing the noise signals, the second such path including second amplifying means;
   c. demodulating means, responsive to the signals out of the first and the second signal path, for producing first and second unipolar signals varying, respectively, as the signals out of the first and the second filter means;
   d. integrating means, responsive to the first and the second unipolar signals, for producing signals varying, respectively, as the root mean square value of such unipolar signals;
   e. feedback means, responsive to the signals out of the integrating means in the second signal path, for controlling the gain of the second amplifying means; and
   f. a threshold circuit, responsive to the signals out of the integrating means, for producing output signals when the root mean square value of the first unipolar signal exceeds the root mean square value of the second unipolar signal by a predetermined amount.

2. A receiver as in claim 1 wherein the feedback means includes an attenuator for reducing the amplitude of the signal controlling the gain of the second amplifier means when the amplitude of the signals from the first amplifying means increases.